W. R. HEWITT.
PISTON.
APPLICATION FILED JUNE 12, 1912.

1,057,643.

Patented Apr. 1, 1913.

2 SHEETS—SHEET 1.

WITNESSES:
Thos. Eastberg
Charles Pickles

INVENTOR
William R. Hewitt.
BY G. H. Strong.
ATTORNEY

W. R. HEWITT.
PISTON.
APPLICATION FILED JUNE 12, 1912.

1,057,643.

Patented Apr. 1, 1913.

2 SHEETS—SHEET 2.

WITNESSES:
Thos. Castberg
Charles Pickles

INVENTOR
William R. Hewitt
BY G. H. Strong
his ATTORNEY

UNITED STATES PATENT OFFICE.

WILLIAM R. HEWITT, OF SAN FRANCISCO, CALIFORNIA.

PISTON.

1,057,643. Specification of Letters Patent. Patented Apr. 1, 1913.

Application filed June 12, 1912. Serial No. 703,212.

*To all whom it may concern:*

Be it known that I, WILLIAM R. HEWITT, a citizen of the United States, residing in the city and county of San Francisco and State of California, have invented new and useful Improvements in Pistons, of which the following is a specification.

This invention relates to improvements in that class of pistons known as "plug pistons" or "pistons having a hood follower".

A particular object of the invention is to provide means for lubricating and packing the piston within the cylinder.

The invention consists in forming an annular space between the piston proper and the hood follower, which is connected by a series of radial ports or passages with annular grooves cut on the outside periphery of the hood follower, and in providing means whereby condensations from the cylinder, such as water, oil, grease or other lubricants, may be collected within the annular space between the piston and hood follower to be used as a lubricant for the piston by being forced through the radial ports into the annular grooves on the outside periphery of the hood follower; the result being to produce the effect of suspending or floating the piston by forcing a thin layer of lubricant under pressure between the piston proper and the cylinder wall.

It also comprises details of construction which will be more fully explained by reference to the accompanying drawings, in which—

Figure 1:
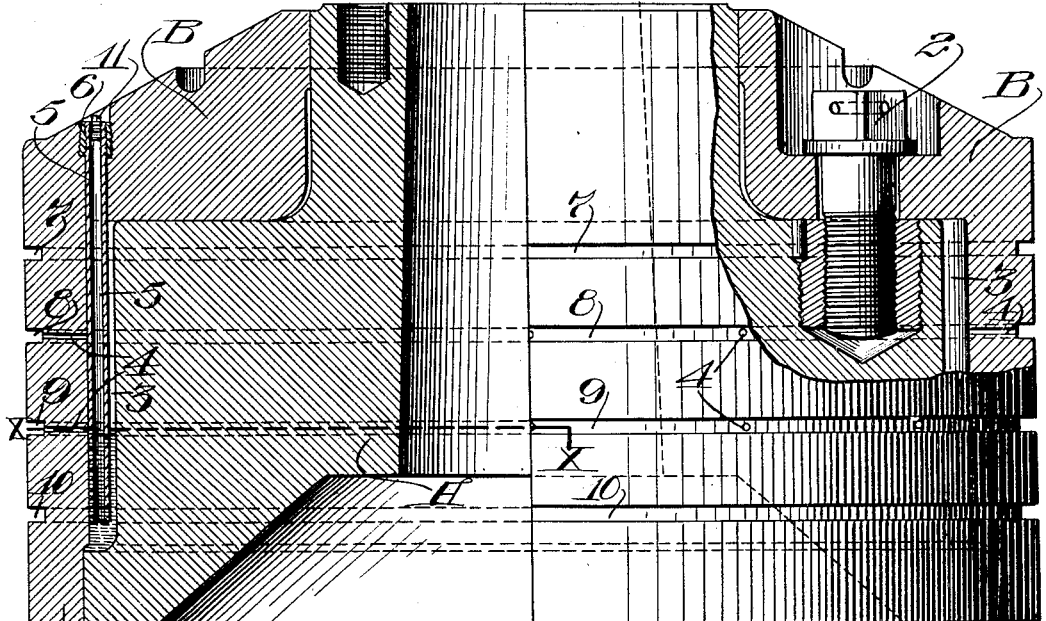
Figure 2:
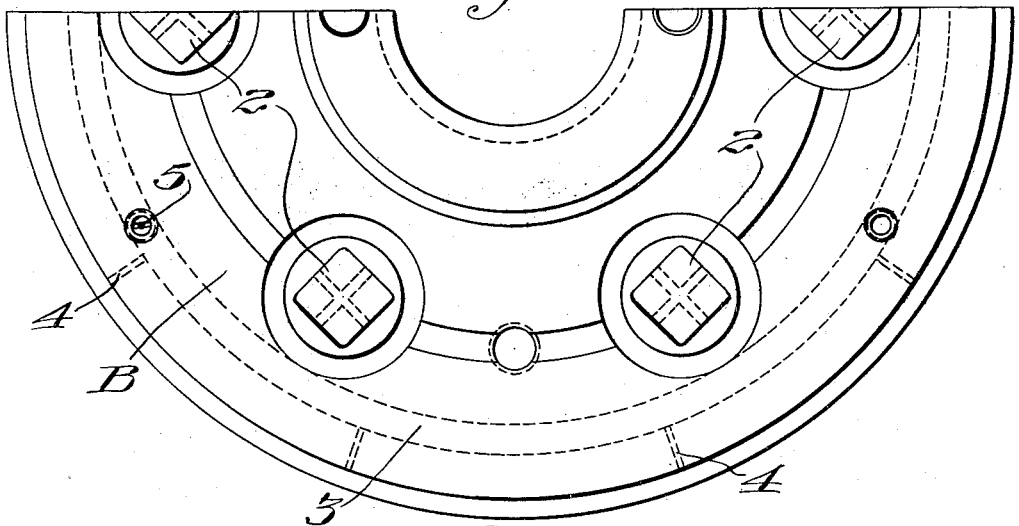
Figure 3:
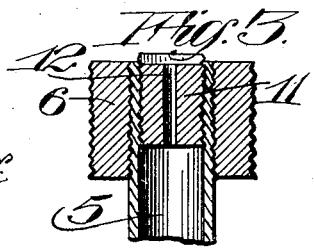
Figure 4:
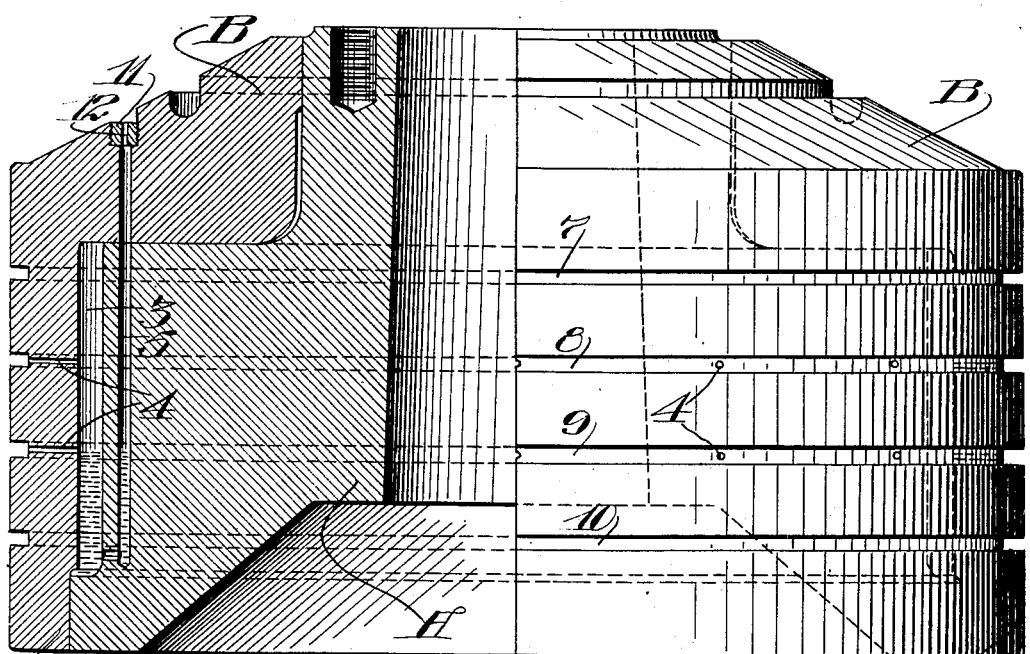
Figure 5:
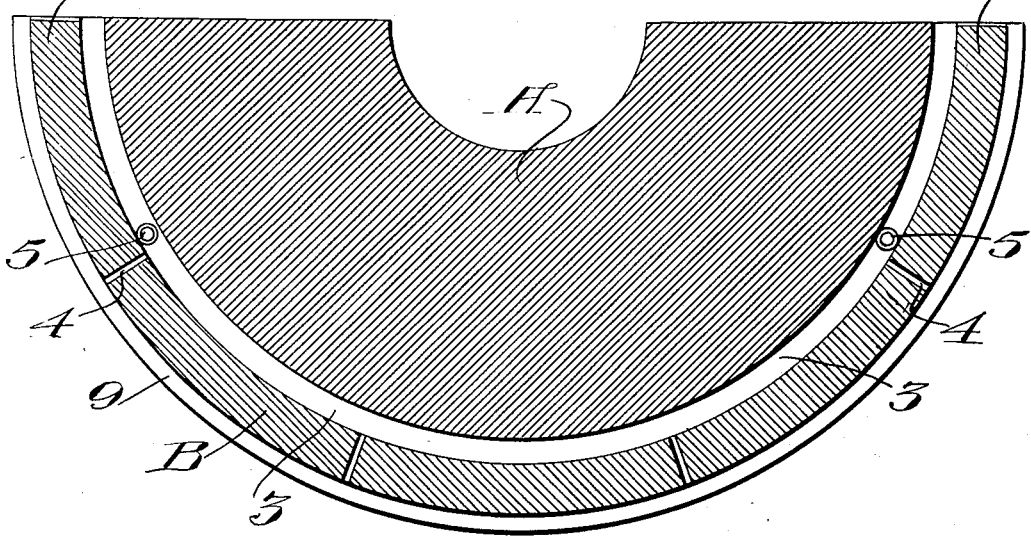

Figure 1 is a side elevation of the piston partly in section. Fig. 2 is a plan view of same. Fig. 3 is an enlarged view, showing the method of mounting the tubes 5 and the means for controlling the admission of steam or lubricants through same. Fig. 4 is a side elevation of the piston partly in section, showing a modification of same. Fig. 5 is a plan section on line X—X, Fig. 1.

This invention relates to improvements in that class of pistons known as "plug pistons" or "pistons having a hood follower"; the particular object of the invention being to provide means for lubricating and packing the piston within the cylinder. With this object in view I have constructed the piston as follows: A indicates the piston proper, which may be secured to a piston-rod, not here shown, in any suitable manner. B indicates a hood follower secured to the piston by the follower bolts 2. Formed between the piston proper and the hood follower is an annular chamber 3 which connects with a suitable number of annular grooves cut in the outside periphery of the hood follower by a series of radial ports 4. Connecting the annular chamber 3 with one of the pressure faces of the piston to allow admission of condensations, like water, oil, grease, or other lubricants, is a suitable number of tubes 5 which are mounted in bushings 6 carried by the hood follower. The tubes 5 extend down into the annular chamber 3 below the level of water or other lubricant that would naturally seek the level of the lowest outlet from the annular chamber 3 to the grooves on the outer periphery of the hood follower; the object being to assist the condensation of steam or other lubricants that enter through the tube, by forcing it through the collected condensations already contained within the annular chamber 3. In the construction here shown, I have provided the hood follower with four grooves, as 7, 8, 9 and 10. The grooves 8 and 9 are shown as being connected with the annular chamber by the radial ports 4. The annular grooves 7 and 10 will become filled with oil or grease in the operation of the piston within the cylinder and will act as packing rings, while the annular grooves 8 and 9 being constantly fed with lubricant from the inner annular chamber 3 will act as lubricating grooves and will force a thin layer of lubricant between the piston and the cylinder walls.

The principle of operation is the well-known friction of a liquid in thin layers between extended surfaces, such as pump plungers or pistons where the frictional resistance is greater than any pressure that might force the water through the spaces between the piston and the cylinder. Thus such condensations as water and oil form a good lubricant, or the two may be associated to form a more effective lubricant. This being so, it has a further advantage of permitting a closer fit of the piston or hood follower in the cylinder, thereby having a tendency to prevent losses by the initial steam or gas vapors passing between the piston and the walls of the cylinder and preventing any tendency of the piston to stick or freeze to the cylinder walls.

In order to regulate or adjust the pressure best suited within the annular chamber of a particular piston under certain pressures, I have provided a plug or valve 11 which may be suitably mounted in the upper end of a tube 5. This is provided with a central opening 12 to suit the particular pressure employed. By reducing the size of the inlet or aperture in this valve or plug, a corresponding change in the amount of steam or other condensed lubricants which enter the inlet chamber will be exerted and will correspondingly regulate and control the amount of lubricant being discharged from the annular grooves 8 and 9 in the hood follower.

When starting the engine, it is found in practice that there will always be a certain amount of condensed steam or water in the cylinder which will, when pressure is exerted on the piston, be forced through the tubes 5 into the annular chamber 3. This will fill the annular chamber and discharge through the radial ports 4 into the annular grooves 8 and 9, from where it is forced in a thin layer between the walls of the cylinder and piston. The lubricant being constantly and continuously forced out between the working surfaces under pressure will produce the effect of suspending or floating the piston.

While this piston has proven itself particularly adapted for use in connection with steam engines, it will be understood that I do not wish to limit myself to this particular application, as the piston may be applied in other engines, such as compressors, internal combustion engines, hot air engines, etc.

Having thus described my invention, what I claim and desire to secure by Letters Patent is—

1. A piston comprising a central cylindrical body, an annular sleeve and hood having surrounding exterior grooves, said sleeve being fixed to the body portion so as to form an intermediate, inclosed annular channel, and tubes fixed in the end face of the hood and extending into the channel, said sleeve having ports connecting the channel with the grooves intermediate between the top and bottom of the sleeve.

2. A piston consisting of a central body having an enlarged base, a hood sleeve, the top of which fits and is secured upon the top of the piston body, and the interior of which has a diameter to fit the base of the piston body and form an annular, intermediate channel, tubes extending down through the top of the hood portion into said channel, said sleeve portion having a plurality of grooves around its periphery, and ports leading from the annular channel to the innermost of the grooves.

3. A piston comprising a main body with an enlarged base, an annular, exteriorly grooved sleeve fitting said base forming an annular channel between itself and the main body, and having an inwardly overhanging portion fitting and secured upon the top of the piston, openings through said overhanging tubes fixed in the openings and extending downward into the annular channel, and pressure reducers adjustably fitted into the upper end of the tubes.

4. A piston and packing consisting of a central body, an exterior sleeve with an intermediate closed annular channel, adjustable, tubular connections between the top of the piston and the channel, said sleeve having centrally located peripheral grooves and ports connecting said grooves and the channel, and other grooves above and below said first-named grooves and unconnected with said channel.

In testimony whereof I have hereunto set my hand in the presence of two subscribing witnesses.

WILLIAM R. HEWITT.

Witnesses:
  G. H. STRONG,
  ZOE HARRISON.